United States Patent
Muschler et al.

(10) Patent No.: US 9,751,375 B2
(45) Date of Patent: Sep. 5, 2017

(54) DRIVEN AXLE OF A DUAL-TRACK VEHICLE

(71) Applicant: Bayerische Motoren Werke Aktiengesellschaft, Munich (DE)

(72) Inventors: Thomas Muschler, Ingolstadt (DE); Falk Gerbig, Allershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/598,470

(22) Filed: Jan. 16, 2015

(65) Prior Publication Data

US 2015/0130158 A1    May 14, 2015

Related U.S. Application Data

(63) Continuation of application No. PCT/EP2013/061745, filed on Jun. 6, 2013.

(30) Foreign Application Priority Data

Jul. 17, 2012   (DE) .................. 10 2012 212 475

(51) Int. Cl.
*B60G 21/05*    (2006.01)

(52) U.S. Cl.
CPC .......... *B60G 21/05* (2013.01); *B60G 2200/42* (2013.01); *B60G 2200/422* (2013.01);
(Continued)

(58) Field of Classification Search
CPC ............ B60G 21/05; B60G 2204/8302; B60G 2200/42; B60G 2200/462; B60G 2204/82;
(Continued)

(56) References Cited

U.S. PATENT DOCUMENTS 2,270,571 A * 1/1942 Woolson .............. B60G 11/23
267/274
2,472,291 A * 6/1949 Ford .................... B60G 11/44
267/229
(Continued)

FOREIGN PATENT DOCUMENTS

CN    101386253 A    3/2009
DE    2 021 535 A1    11/1971
(Continued)

OTHER PUBLICATIONS

German Search Report dated Mar. 8, 2013 (Five (5) pages).
(Continued)

*Primary Examiner* — Paul N Dickson
*Assistant Examiner* — Timothy Wilhelm
(74) *Attorney, Agent, or Firm* — Crowell & Moring LLP

(57)    ABSTRACT

A driven axle of a dual-track vehicle is provided in which a wheel-guiding control rod on the body of the vehicle or on a cross member connected to the body of the vehicle is stabilized spatially in an slightly elastic fashion via a control rod bearing on the body. The control rod of the right-hand wheel is additionally connected to the control rod of the left-hand wheel via a coupling rod. The coupling rod is exclusively supported on the left-hand and right-hand control rod, preferably in the vicinity of the respective control rod bearing on the body of the vehicle that is disposed in an offset fashion in the longitudinal direction of the vehicle relative to the associated wheel bearing. A mechanical deep-pass filter is provided in the coupling rod and/or in the connection between the coupling rod and a control rod stabilized relative thereto.

8 Claims, 1 Drawing Sheet

(52) U.S. Cl.
CPC .... *B60G 2200/462* (2013.01); *B60G 2204/82* (2013.01); *B60G 2204/8302* (2013.01)

(58) Field of Classification Search
CPC ............ B60G 2200/422; B60G 21/026; B60G 21/051
See application file for complete search history.

(56) References Cited

U.S. PATENT DOCUMENTS

| | | | | |
|---|---|---|---|---|
| 3,085,817 | A * | 4/1963 | Krause | B60G 21/0556 192/85.14 |
| 3,117,647 | A * | 1/1964 | Polko | B60G 21/05 180/41 |
| 3,279,556 | A * | 10/1966 | Kozicki | B60G 21/055 180/54.1 |
| 3,767,224 | A * | 10/1973 | Schneeweiss | B60G 21/051 267/188 |
| 4,132,431 | A * | 1/1979 | Von Der Ohe | B60G 3/26 267/190 |
| 4,140,334 | A * | 2/1979 | Takeda | B60G 7/02 267/251 |
| 4,223,902 | A * | 9/1980 | Fry | B60G 9/00 280/124.126 |
| 4,223,910 | A * | 9/1980 | Fry | B60G 9/00 280/124.11 |
| 4,234,205 | A * | 11/1980 | Thiesce | B60G 11/183 280/124.107 |
| 4,415,178 | A * | 11/1983 | Hatsushi | B60G 3/28 267/276 |
| 4,600,072 | A * | 7/1986 | Krude | B60G 3/225 180/348 |
| 4,625,995 | A * | 12/1986 | Aubry | B60G 21/051 267/148 |
| 4,813,507 | A | 3/1989 | Tanaka et al. | |
| 5,215,329 | A * | 6/1993 | Santo | B60G 21/051 280/124.128 |
| 5,597,175 | A * | 1/1997 | Tuan | B60G 21/051 280/124.111 |
| 6,152,467 | A * | 11/2000 | Alesso | B60G 3/225 280/124.13 |
| 6,688,619 | B2 * | 2/2004 | Biard | B60G 11/60 267/189 |
| 7,543,833 | B2 * | 6/2009 | Lundmark | B60G 3/145 280/124.128 |
| 7,588,260 | B2 | 9/2009 | Lopez et al. | |
| 8,286,979 | B2 * | 10/2012 | Schote | B60G 3/20 280/124.1 |
| 8,684,381 | B2 * | 4/2014 | Buhl | B60G 17/0277 280/124.106 |
| 2002/0047244 | A1 | 4/2002 | Behrens et al. | |
| 2008/0111336 | A1 * | 5/2008 | Aubarede | B60G 7/008 280/124.128 |
| 2009/0066153 | A1 | 3/2009 | Bitz et al. | |

FOREIGN PATENT DOCUMENTS

| | | |
|---|---|---|
| DE | 24 06 433 A1 | 8/1975 |
| DE | 23 55 588 C2 | 6/1982 |
| DE | 35 35 783 A1 | 4/1986 |
| DE | 38 25 780 A1 | 2/1990 |
| DE | 40 21 157 A1 | 2/1991 |
| DE | 40 21 485 C1 | 7/1991 |
| DE | 100 07 047 A1 | 8/2001 |
| DE | 10 2008 010 614 A1 | 9/2009 |
| DE | 10 2009 023 434 A1 | 12/2009 |
| FR | 2 318 755 A1 | 2/1977 |
| GB | 2 245 531 A | 1/1992 |
| JP | 62-12406 A | 1/1987 |

OTHER PUBLICATIONS

Chinese Office Action issued in counterpart Chinese Application No. 201380034586.7 dated Dec. 8, 2015 with English-language translation (nine (9) pages).

German-language Office Action issued in counterpart European Application No. 13729297.5 dated Mar. 11, 2016 (four (4) pages).

Chinese Office Action issued in counterpart Chinese Application No. 201380034586.7 dated Sep. 20, 2016 with English-language translation (thirteen (13) pages).

Chinese Office Action issued in counterpart Chinese Application No. 201380034586.7 dated Apr. 12, 2017 with English translation (12 pages).

Japanese Office Action issued in counterpart Japanese Application No. 2015-522003 dated May 30, 2017 with English translation (six pages).

* cited by examiner

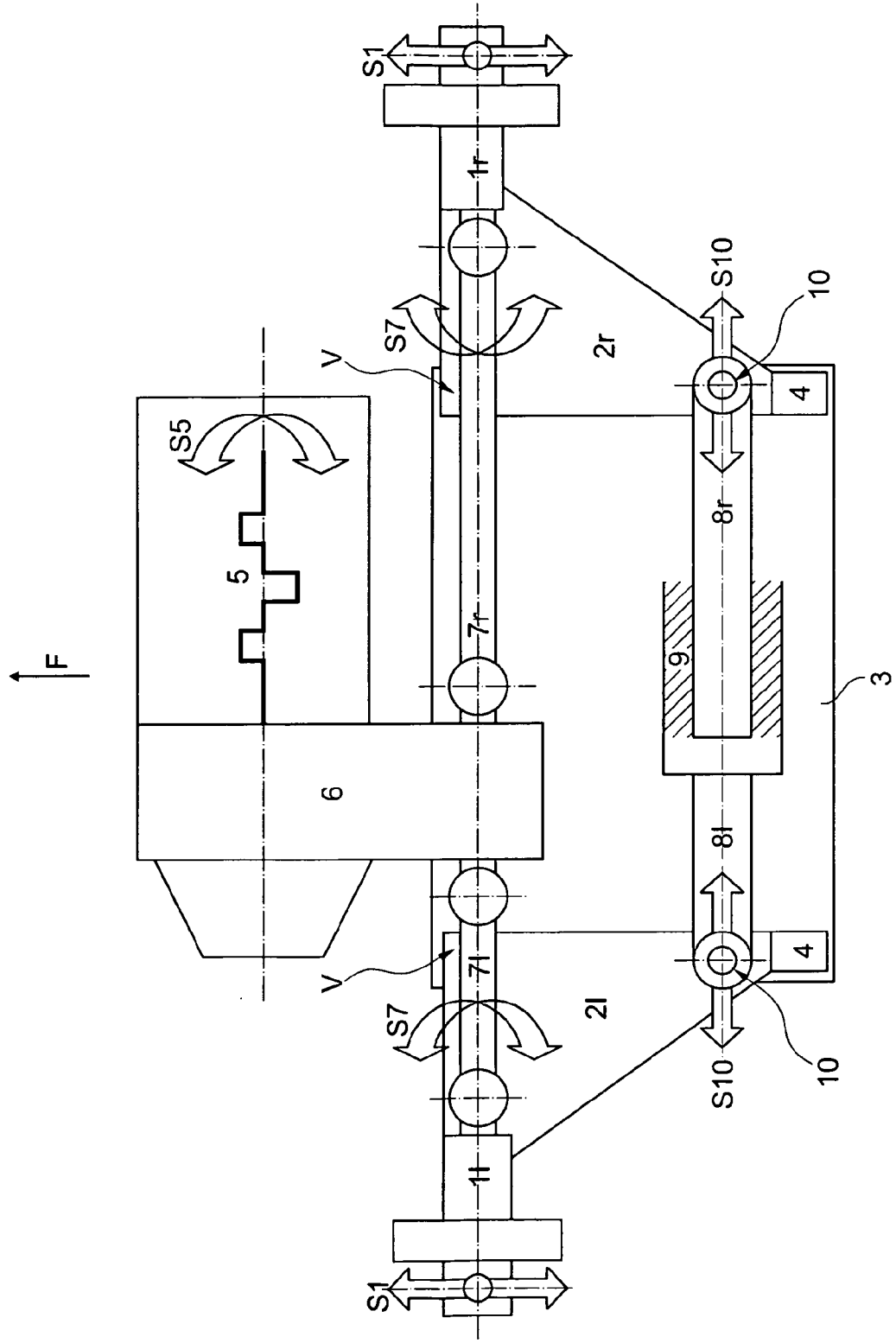

DRIVEN AXLE OF A DUAL-TRACK VEHICLE

CROSS REFERENCE TO RELATED APPLICATIONS

This application is a continuation of PCT International Application No. PCT/EP2013/061745, filed Jun. 6, 2013, which claims priority under 35 U.S.C. §119 from German Patent Application No. 10 2012 212 475.6, filed Jul. 17, 2012, the entire disclosures of which are herein expressly incorporated by reference.

BACKGROUND AND SUMMARY OF THE INVENTION

The invention relates to a driven axle, in particular a front axle, of a dual-track vehicle, in which a wheel-guiding control rod on the body of the vehicle or on a cross member connected to the body of the vehicle is stabilized spatially in a slightly elastic fashion via a control rod bearing on the body, and in which the control rod of the right-hand wheel is additionally connected to the control rod of the left-hand wheel via a coupling rod.

For prior art, reference is made, for example, to DE 23 55 588 C2, in which a front-wheel suspension for motor vehicles is disclosed having one upper triangular guidance control rod and one lower triangular guidance control rod, in which the lower rear guide arms of the left-hand and right-hand front wheel of the vehicle are supported elastically on a common, so-called, transverse yoke, which in turn is elastically connected to the lateral longitudinal bearings of the vehicle body. With this new construction, it is possible to largely prevent "front-end shaking," i.e., the tendency of a vehicle to exhibit jolt-like vibrations caused by uneven driving surfaces and often reinforced by the natural vibrations of the vehicle drive system. The prior art discloses such an axle construction where, in other words, a wheel-guiding control rod of the left front wheel is connected to the corresponding guidance control rod of the right front wheel via a transverse yoke, for which the term "coupling rod" is used in the present case, for non-driven front wheels.

In the course of the development of motor vehicles to be more comfortable, in order to prevent front-end shaking or the like, the elasticity in the supports (or bearings) of the wheel-guiding control rods on the vehicle body or on a cross member and, in the case of a cross member, also the elasticity in the mounts of the cross member on the vehicle body, was adapted accordingly. In order to prevent the intensification of such vehicle vibrations due to the natural vibrations of the vehicle drive system, its bearings, known as motor bearings, were further improved accordingly.

However, it has been shown that, particularly when using internal combustion reciprocating piston engines with a low number of cylinders as vehicle drive systems, dynamic longitudinal vibrations on the vehicle wheels can result on the driven vehicle axle that, up to now, could only be mitigated by the use of additional absorbing masses and laborious adaptation of the relevant elastic suspensions or essentially prevented using extremely elaborate motor bearings.

The object of the present invention is to provide an improvement in this regard. This and other objects are achieved for a driven axle of a dual-track vehicle in which a wheel-guiding control rod on the body of the vehicle or on a cross member connected to the body of the vehicle is stabilized spatially in a slightly elastic fashion via a control rod bearing on the body, and in which the control rod of the right-hand wheel is additionally connected to the control rod of the left-hand wheel via a coupling rod. The coupling rod is exclusively supported on the above-mentioned left-hand and right-hand control rods, preferably near the respective control rod bearing that is on the body and disposed at an offset in the longitudinal direction of the vehicle relative to the associated wheel bearing or the midpoint of the wheel partially driven by the control rod. Further, in the coupling rod and/or in the connection between the coupling rod and one of the control rods supported opposite one another via the coupling rod, a mechanical low-pass filter is provided that is preferably embodied as an elastomer element.

It is known that cyclic irregularities of the vehicle drive system and, in particular, periodic fluctuations resulting therefrom of the torque exerted by the drive system via the wheel drive shafts cause corresponding fluctuations in the driving power transferred from the vehicle wheels to the driving surface. As a result, cyclic forces, known as disturbance forces, having a frequency determined by the roughly periodic fluctuations, are introduced into the vehicle body, which also disrupt the acoustics in the interior of the vehicle. It has now been shown that such opposing disturbance forces of an essentially equal degree introduced from the suspension of the left-hand and right-hand driven vehicle wheel into the vehicle body are able to compensate for one another, i.e., are able to at least approximately cancel each other out, if a pair of corresponding control rods on the left and right wheel suspensions are connected to one another via an essentially rigid component in the relevant frequency range in or with which these disturbance forces occur. Such an essentially rigid component is referred to in the present case as a coupling rod without the intent of creating any limitation to a purely "rod-shaped" component.

Preferably, this coupling rod is connected to the respective control rod near the control rod bearing on the body which, viewed in the longitudinal direction of the vehicle, is disposed at an offset relative to the associated wheel bearing or relative to the midpoint of the wheel partially driven by the control rod. In this manner, longitudinal vibrations of the driven wheel or wheel bearing resulting from cyclic irregularities of the drive system are converted to transverse vibrations of the region of the control rod near the bearing that now act via the control rod according to the invention originating from the left-hand control rod and the right-hand control rod opposite one another, thus canceling one another out.

The transmission or redirection of the cyclic irregularities of the drive system from longitudinal vibrations of the wheel or wheel bearing to transverse vibrations of a section or region of the control rod described up to now is particularly effective in the case of triangular transverse control rods, which are known to the skilled practitioner, but normally have a single connection point to the wheel bearing and to mounting points on the vehicle body or on a cross member connected therebetween.

A coupling rod according to the invention, of which a plurality may also be provided on one axle, differs significantly from the so-called transverse yoke in the prior art described at the outset. Namely, the latter is connected on both ends directly to the vehicle body via an elastic bearing, i.e., mounted directly on the vehicle body, and the respective left-hand or right-hand (guide) control rod is also supported via an elastic bearing on the transverse yoke; each control rod is able to introduce forces in the longitudinal direction of the vehicle and in the transverse direction of the vehicle as well as in the direction of the vertical axis of the vehicle into the transverse yoke, which then in turn conducts these forces into the vehicle body in all three dimensions. In other words, in the prior art, each of the control rods supported on the transverse yoke is spatially supported on the transverse yoke, namely providing the degree of rotational play in all three dimensions necessary for the compression and rebound movement of the wheel guided by the control rod, among other things, and the transverse yoke is in turn supported spatially, namely in all three dimensions, on the vehicle body.

In contrast, in the present invention, each of the two control rods connected to one another via the at least one coupling rod according to the invention is supported initially in a slightly elastic fashion directly on the vehicle body, in a spatial fashion in each control rod bearing, i.e., in the longitudinal and transverse directions of the vehicle and in the direction of the vertical axis of the vehicle with the necessary degree of rotational play for the compression and rebound movement, i.e., the wheel lift of the wheel guided by the control rod, among other things. Preferably, at least one coupling rod according to the invention is attached to the control rod in the vicinity of the control rod bearing, which is slightly elastic as is customary, the coupling rod itself not being supported at any other point. This coupling rod connects the control rod of the left vehicle wheel to the corresponding control rod of the right vehicle wheel and thus runs at least approximately in the transverse direction of the vehicle. The transfer of force through the coupling rod from the left-hand control rod to the right-hand control rod and vice versa can therefore occur naturally only in the transverse direction of the vehicle, more precisely in the direction of the coupling rod, in particular if a ball-and-socket joint is provided for the connection between the coupling rod and each control rod. The ball-and-socket joint should preferably be at least approximately free of play so as to allow an essentially rigid support of the two above-mentioned control rods relative to one another via the coupling rod according to the invention. In other words, the connection according to the invention between the coupling rod and the respective control rod is structured in such a way that it is virtually only able to transfer forces oriented in the longitudinal direction of the coupling rod from each control rod into the coupling rod, with the spatial, namely three-dimensional support of each control rod on the vehicle body explicitly not occurring by way of the coupling rod, in contrast to the prior art mentioned at the outset.

Regarding the above-mentioned term "relevant frequency range" of the essentially rigid component, for example, in the form of the so-called coupling rod, it is particularly advantageous for this rigidity to be in effect essentially only with regard to relatively high-frequency disturbance forces, i.e., with regard to the cyclic irregularities of the drive system discussed above or the resulting fluctuations in the driving forces exerted by the driven vehicle wheels on the driving surface, which naturally have a higher frequency than fluctuations in the transverse forces conducted between the wheels and the driving surface, i.e., cornering forces. With regard to fluctuations in the cornering forces introduced into the wheel suspension or axle via the wheels, a coupling rod according to the invention should be not at all or at least only slightly effective, i.e., significantly less effective, in order to maintain the otherwise desired individual wheel suspension and to prevent a direct influence of the wheel suspension of the left wheel on that of the right wheel (and vice versa). The latter is shown according to the invention in that a "mechanical" low-pass filter is provided in the coupling rod and/or in the connection between the coupling rod and one of the control rods supported opposite one another via the coupling rod. Such a mechanical low-pass filter essentially cancels the rigidity of the coupling rod (or the like) in low-frequency ranges in or with which the cornering forces act on the wheels, such that virtually no forces are transmitted via the coupling rod in these low-frequency ranges. The low-pass filter according to the invention allows low-frequency forces to simply pass without said forces being transmitted by the coupling rod according to the invention. In contrast, the low-pass filter according to the invention blocks higher-frequency ranges in or with which the above-mentioned disturbance forces resulting from the cyclic irregularity of the vehicle drive system occur, as a result of which the coupling rod according to the invention then transmits the disturbance forces as desired between the left-hand and right-hand control rods.

Preferably, the above-mentioned low-pass filter may be an elastomer element embodied in a suitable fashion with regard to the required property described in detail above. Alternatively, however, it may also be a suitably structured spring damper. Thus, in order to prevent or at least reduce mutual influence on elasto-kinematics by the right and left wheel of an axle equipped with at least one coupling rod as described above, the insertion of an additional component acting as a mechanical low-pass filter into the tension/compression load path of the coupling rod is recommended. In addition to a bushing having an elastomer element with the frequency-dependent hysteresis based on its material properties, a suitable spring damper may also be provided for this purpose.

On an axle as described up to this point, the forced vibrations of relatively high frequency conducted from the vehicle drive system into the axle which, in the prior art common up to now (individual wheel suspension without coupling rod and without a "transverse yoke"), are conducted into the vehicle body, i.e., into the carriage, are mutually compensated using a connection according to the invention via the coupling rod within the connection of a left-hand and right-hand wheel-guiding control rod. For example, in a three-cylinder internal combustion engine as the vehicle drive system, this frequency corresponds to 1.5 times the engine order. Despite this connection, the wheel-guiding control rod according to the general prior art (individual wheel suspension without a coupling rod and without a "transverse yoke") can be connected via elastic bearings directly, or indirectly via a cross member, to the vehicle body for the regular decoupling of other vibration portions. A deep-pass filter directly integrated into the coupling rod has a greater rigidity at higher frequencies and transmits the disruptive, higher-frequency, vibrations that originate from the internal combustion engine in a significantly more pronounced manner than forces with low frequencies, thus achieving their direct compensation. The relatively slow variations in force, in particular from cornering forces that are introduced by the chassis and advantageously act on the elasto-kinematics of the respective side of the vehicle, are kept away from the other side of the vehicle because an elastomer element acting as a deep-pass filter or a spring damper mentioned above allows relatively slow relative movements of both parts of a coupling rod into which such a mechanical deep-pass filter is integrated or between which coupling rod parts such a mechanical deep-pass filter has been installed.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram of an exemplary embodiment of the present invention.

DETAILED DESCRIPTION OF THE DRAWINGS

FIG. 1 shows a single-wheel suspension of driven front wheels of an automobile, with only a lower control rod level being shown. The control rods of the left-hand and right-hand wheel are connected to one another via a coupling rod according to the invention, otherwise the single-wheel suspension comprises conventional triangular transverse control rods.

The left-hand wheel bearing of the axle, shown in a view toward the driving surface, has the reference character 1*l* and the right-hand wheel bearing has the reference character 1*r*. A lower left-hand wheel-guiding control rod in the form of a triangular transverse control rod has the reference character 2*l* and the corresponding right-hand control rod has the reference character 2*r*. Not shown are connection points embodied in the customary fashion in the form of slightly elastic rubber bearings for these control rods 2*l* and 2*r* on the associated wheel bearings 1*l* and 1*r* and on a cross member 3 in its front region viewed in the driving direction F. However, the connection points are located in the vicinity of a point towards which an arrow designated with the letter "v" is pointing and thus in the vicinity of one of the rotational midpoints of the two wheel bearings 1*l*, 1*r* and in a line running in the transverse direction of the vehicle.

Symbolically shown, however, is one control rod bearing 4, by way of which each lower end region of the respective triangular control rod 2*l* or 2*r* is spatially supported, i.e., in three dimensions (longitudinal direction of the vehicle, transverse direction of the vehicle, and vertical axis of the vehicle) in a slightly elastic fashion (namely via a conventional rubber bearing) on the front cross member 3 such that the control rod 2*l* or 2*r* is able to execute the deviating movement occurring in the course of a lift movement of the wheel or wheel bearing 1*l* or 1*r*. Here, this rear control rod bearing 4 on the body is offset relative to the respective wheel bearing 1*l* or 1*r* as viewed in the drive direction F, i.e., it is located behind the front control rod bearing on the cross member 3 designated by the arrow "v." Viewed in the transverse direction of the vehicle, the respective wheel bearings 1*l* or 1*r* and the control rod bearing 4 are disposed at a sufficient distance from one another in the horizontal direction that even a joint point 10 (to be discussed in detail below) located on the control rod 2*l* or 2*r* is located at a distance from the wheel bearing 1*l* or 1*r* and, more precisely, from a linking point not visible in the FIGURE of the control rod 2*l* or 2*r* on the wheel bearing 1*l* or 1*r*.

The reference character 5 designates the crankshaft of the drive system of the vehicle, which is otherwise not shown and is embodied, for example, as a three-cylinder internal combustion reciprocating piston engine. Functionally connected to the crankshaft 5 is a gearbox 6 having a differential, from which the drive shafts 7*l* and 7*r* lead to the left and right wheel bearing 1*l* and 1*r*, respectively, or, more precisely, to a driving hub disposed therein for each wheel, which is not shown.

An essential element of the present axle and the present invention is a coupling rod 8 extending in the transverse direction of the vehicle that, in the present case, is equipped with an integrated mechanical deep-pass filter 9 in the form of a bushing (only shown symbolically) having an elastomer element that can be described as a spring damper or operates as such. To this end, the coupling rod 8 is embodied in a divided fashion with a left-hand coupling rod half 8*l* associated with the left-hand control rod 2*l* and a right-hand control rod half 8*r* associated with the right-hand control rod 2*r*, between which the above-mentioned mechanical deep-pass filter 9 (compare the discussion thereof before the description of the drawing) is interconnected. The left-hand coupling is rod half 8*l* is connected to the left-hand control rod 2*l* in an at least approximately play-free joint point 10, and the right-hand coupling rod half 8*r* is connected to the right-hand control rod 2*r* in an at least approximately play-free joint point 10. These joint points 10 are preferably embodied in the form of ball-and-socket joints and provided in the vicinity of the rear control rod bearing 4 on the body. This allows the vibration compensation shown by the arrows and described below.

The double arrow S5 represents rotational vibrations of the crankshaft 5 that are transmitted by way of the drive shafts 7*l*, 7*r* according to the arrow S7 to the wheels mounted on the wheel bearings 1*l*, 1*r*. This results in longitudinal vibrations according to the double arrow S1 of the respective wheel bearing 1*l*, 1*r*, which are transmitted via the respective control rod 2*l*, 2*r*. However, according to the invention, these vibrations do not arrive in the control rod bearing 4; rather, the longitudinal vibrations S1 of the left wheel bearing 1*l* and the right wheel bearing 1*r* transmitted into the control rods 2*l*, 2*r* cancel one another out via the coupling rod 8 in the form of transverse vibrations introduced from the control rods 2*l*, 2*r* via the joint points 10 into the coupling rod 8 according to the double arrow S10 in an at least approximately mutual fashion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driven axle of a dual-track vehicle, comprising:
  a control rod of a right-hand wheel of the dual-track vehicle;
  a control rod of a left-hand wheel of the dual-track vehicle;
  respective control rod bearings configured to stabilize spatially in a slightly elastic fashion the left-hand and right-hand control rods on a body of the vehicle or on a cross-member connected to the body of the vehicle;
  a coupling rod connecting the left-hand and right-hand control rods; and
  a mechanical deep-pass filter provided in the coupling rod and/or in a connection between the coupling rod and a respective left-hand and right-hand control rod, wherein
    the coupling rod is exclusively supported on the respective left-hand and right-hand control rods in a vicinity of the respective control rod bearings on the body of the vehicle, and
    the respective control rod bearings are disposed offset in a longitudinal direction of the vehicle relative to associated left-hand and right-hand wheel bearings; and drive shafts that lead to the left-hand and right-hand wheel bearings, respectively, the drive shafts introducing rotational vibrations from a crankshaft into the left-hand and right-hand wheels of the vehicle resulting in longitudinal vibrations of the wheels, that are transmitted into the respective control rods and cancelled out in the form of transverse vibrations in the coupling rod.

2. The axle according to claim 1, wherein the mechanical deep-pass filter is formed by an elastomer element.

3. The axle according to claim 2, further comprising an approximately play-free ball-and-socket joint provided for each respective connection between the coupling rod and the respective left-hand and right-hand control rod.

4. The axle according to claim 3, wherein the left-hand and right-hand control rods are lower triangular transverse control rods, the respective connection to the coupling rod being provided in the vicinity of the respective control rod bearing.

5. The axle according to claim 1, further comprising an approximately play-free ball-and-socket joint provided for each respective connection between the coupling rod and the respective left-hand and right-hand control rod.

6. The axle according to claim 1, wherein the left-hand and right-hand control rods are lower triangular transverse control rods, the respective connection to the coupling rod being provided in the vicinity of the respective control rod bearing.

7. The axle according to claim 1, wherein the coupling rod includes a right-hand control rod half and a left-hand control rod half and the mechanical deep-pass filter is interposed between the right-hand control rod half and the left-hand control rod half.

8. The axle according to claim 1, wherein each connection between the coupling rod and the respective left-hand and right-hand control rods is structured so as to only transfer forces oriented in a longitudinal direction of the coupling rod from each respective control rod into the coupling rod.

* * * * *